United States Patent
Blanchard et al.

(10) Patent No.: US 9,663,360 B2
(45) Date of Patent: May 30, 2017

(54) OBTAINING A SOLID FORM CONTAINING HEAT-STABILIZED BORAZANE, SAID SOLID FORM, AND THE USE THEREOF FOR GENERATING HYDROGEN

(71) Applicants: HERAKLES, Le Haillan (FR); CENTRE NATIONAL DE LA RECHERCHE SCIENTIFIQUE, Paris (FR)

(72) Inventors: Hélène Blanchard, Pessac (FR); Joël A. Renouard, Saint Martin en Biere (FR); Ali Darwiche, Montpellier (FR); Raphaël L. Janot, Coisy (FR)

(73) Assignees: HERAKLES, Le Haillan (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 0 days.

(21) Appl. No.: 14/894,646

(22) PCT Filed: May 28, 2014

(86) PCT No.: PCT/FR2014/051258
§ 371 (c)(1),
(2) Date: Nov. 30, 2015

(87) PCT Pub. No.: WO2014/191682
PCT Pub. Date: Dec. 4, 2014

(65) Prior Publication Data
US 2016/0115018 A1    Apr. 28, 2016

(30) Foreign Application Priority Data

May 30, 2013 (FR) ...................... 13 01229

(51) Int. Cl.
*C01B 3/04* (2006.01)
*C06D 5/04* (2006.01)
(Continued)

(52) U.S. Cl.
CPC .................. *C01B 3/04* (2013.01); *C06D 5/04* (2013.01); *C06D 5/06* (2013.01);
(Continued)

(58) Field of Classification Search
CPC .............. C01B 2203/0266; C01B 3/04; C01B 2203/1205; C01B 2203/1258; Y02E 60/364; C06D 5/06; C06D 5/04
See application file for complete search history.

(56) References Cited

FOREIGN PATENT DOCUMENTS

| CN | 102259837 A | 11/2011 |
|---|---|---|
| FR | 2 834 710 A1 | 7/2003 |
| WO | WO 2009/138629 A1 | 11/2009 |

OTHER PUBLICATIONS

Demirci et al. "Sodium borohydride versus ammonia borane, in hydrogen storageand direct fuel cell applications", Energy Environ. Sci., Feb. 2009, 627-637.*

(Continued)

*Primary Examiner* — Stanley Silverman
*Assistant Examiner* — Syed Iqbal
(74) *Attorney, Agent, or Firm* — Pillsbury Winthrop Shaw Pittman LLP (57) ABSTRACT

A process for obtaining a solid form containing heat-stabilized borazane is described. The solid form is capable of generating hydrogen by thermal decomposition or by a self-maintained combustion reaction. Within the solid form containing borazane, the borazane is heat-stabilized. It has thus been heat-stabilized by making an oxidized layer at its surface.

20 Claims, 4 Drawing Sheets

(51) Int. Cl.
*C06D 5/06* (2006.01)
*C06B 45/30* (2006.01)

(52) U.S. Cl.
CPC ............... *C01B 2203/0266* (2013.01); *C01B 2203/1205* (2013.01); *C01B 2203/1258* (2013.01); *Y02E 60/364* (2013.01)

(56) References Cited

OTHER PUBLICATIONS

International Preliminary Report on Patentability and the Written Opinion of the International Searching Authority as issued in International Patent Application No. PCT/FR2014/051258, dated Dec. 1, 2015.

International Search Report as issued in International Patent Application No. PCT/FR2014/051258, dated Jul. 22, 2014.

Demirci, U.B., et al., "Sodium borohydride *versus* ammonia borane, in hydrogen storage and direct fuel cell applications," Energy & Environmental Science, vol. 2, No. 6, 2009, pp. 627-637.

Reller, C., et al., "A Self-Contained Regeneration Scheme for Spent Ammonia Borane Based on the Catalytic Hydrodechorination of $BCl_3$," Angewandte Chemie International Edition, vol. 51, No. 47, 2012, pp. 11731-11735.

Huang, Y., et al., Database CA [online], Chemical Abstracts Service, 2011, 8 pages.

\* cited by examiner

OBTAINING A SOLID FORM CONTAINING HEAT-STABILIZED BORAZANE, SAID SOLID FORM, AND THE USE THEREOF FOR GENERATING HYDROGEN

CROSS-REFERENCE TO RELATED APPLICATIONS

This application is the U.S. National Stage of PCT/FR2014/051258, filed May 28, 2014, which in turn claims priority to French patent application number 13/01229 filed May 30, 2013. The content of these applications are incorporated herein by reference in their entireties.

The present invention was developed in reference to the technical problem of the heat stability of borazane.

The subject of the present invention is more particularly:
a process for producing a solid form containing heat-stabilized borazane, said solid form being capable of generating hydrogen by thermal decomposition or by a self-maintained combustion reaction,
said solid form containing heat-stabilized borazane, and
a process for generating hydrogen comprising the thermal decomposition or the self-maintained combustion of said solid form containing heat-stabilized borazane.

Within said solid form containing borazane, said borazane is, according to the invention, heat-stabilized.

Borazane (or ammonia borane), which compound corresponds to the chemical formula $NH_3BH_3$, was identified as an excellent candidate for storing hydrogen. Specifically, its weight content of hydrogen, of 19.6%, makes it a starting material of choice for generating hydrogen.

Its use as a hydrogen generator has been described according to two variants.

According to the first variant, which is conventional, it is directly heat-treated (in the absence of oxygen, with raising of the temperature up to more than 1300° C.). It then rapidly releases hydrogen, by thermal decomposition, in 3 successive steps: a first step which starts at about 80-90° C., a second step which starts at about 150-160° C. and a third step which starts at more than 1300° C. The temperature values indicated above for the start of the first and second steps are given as a guide. Specifically, these values depend on the purity of the product and the rate of temperature increase. Thus, a borazane decomposition temperature of 78° C. is indicated in Energy Environmental Science, 2009, 2, 627-637, and, in Angewandte Chemie International Edition, 2012, 51, 11731-11735, it is reported that borazane begins to release hydrogen at 95° C.

According to the second variant, described especially by the Applicant in patent application WO 2009/138629, it is used after formulation with at least one inorganic oxidizing agent. It then releases hydrogen in a self-maintained (exothermic) combustion reaction.

At the present time, however, the use of borazane, most particularly as a hydrogen generator, is curbed by its thermal instability. The reason for this is that borazane does not satisfy the thermal stability standards required for general public use.

In support of these assertions, the Applicant is providing results of analyses by thermogravimetry and by differential scanning calorimetry (DSC). The analyses were preformed under argon. Thus, the thermal decomposition phenomena observed are not contaminated by oxidation phenomena.

1) FIGS. 1A and 1B, and also table 1 below, show said thermogravimetric analysis results. A sample (100 mg) of borazane powder (median diameter (by weight) of 350 μm) was heated under argon at given temperatures (respectively of 50° C. (FIG. 1A), 70° C. (FIG. 1B, curve 1) and 80° C. (FIG. 1B, curve 2 and table 1)). The loss of weight of the test sample was monitored over a time t (of 70 hours at a temperature of 50° C. (FIG. 1A), of more than 20 hours at temperatures of 70° C. and 80° C. (FIG. 1B and table 1)).

Figure 1A:
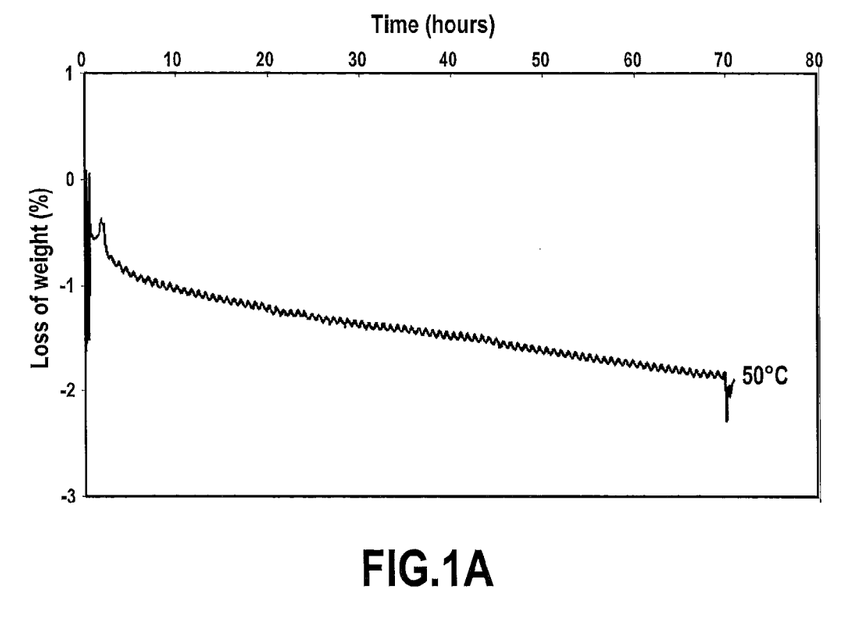

The decomposition is very slow at 50° C., and is 0.02% per hour (FIG. 1A).

It becomes significant at and above 55° C.

It accelerates when the temperature reaches 70° C., 80° C. (FIG. 1B). A start of loss of weight is noted after 7 hours at 70° C. and after only 2 hours at 80° C. More precisely, at 80° C., the loss of weight indicated in table 1 below is observed.

TABLE 1

| Time (hours) | Loss of weight under argon (%*) | Decomposed borazane (%) |
|---|---|---|
| 5 | 0.8 | 4 |
| 10 | 7 | 35 |
| 15 | 7 | 35 |
| 20 | 7 | 35 |

*the % of loss of weight corresponds to the percentage of $H_2$ removed out of the starting (theoretical) amount of 19.6%.

Figure 2:
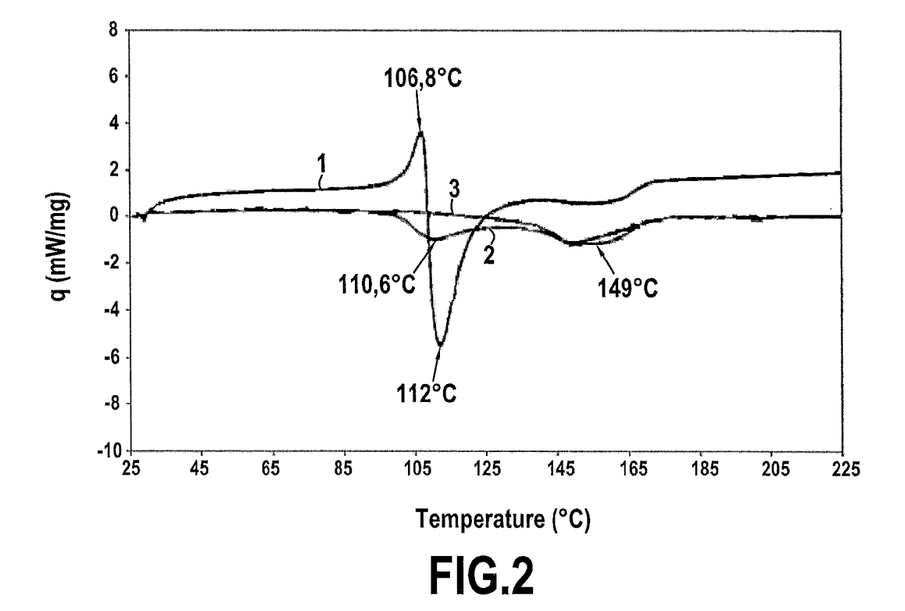

2) FIG. 2 shows said differential scanning calorimetry (DSC) analysis results. These results were also obtained with samples of 100 mg of powder (median Ø (by weight) of 350 μm).

Curve 1 was obtained with the reference product: borazane which has not undergone any heating. Said curve 1 shows a first endotherm at 106.8° C. (which corresponds to the melting of borazane) and a first exotherm with a maximum at 112° C. (which corresponds to the start of thermal decomposition of borazane with removal of the first mole of hydrogen: $xNH_3BH_3 \rightarrow (NH_2BH_2)_x$). This curve 1 is in agreement with the general knowledge of those skilled in the art.

Curve 2 was obtained with borazane powder preheated under argon at 70° C. for 24 hours. Said curve 2 again shows a "small" exotherm at 110.6° C. A second exotherm takes place at a temperature of 149° C. (>112° C.), which proves that the borazane is already partly decomposed.

Curve 3 was obtained with borazane powder preheated under argon at 80° C. for 24 hours. Melting is no more seen on said curve 3. Only the second decomposition at 149° C. is still visible.

Figure 1B:
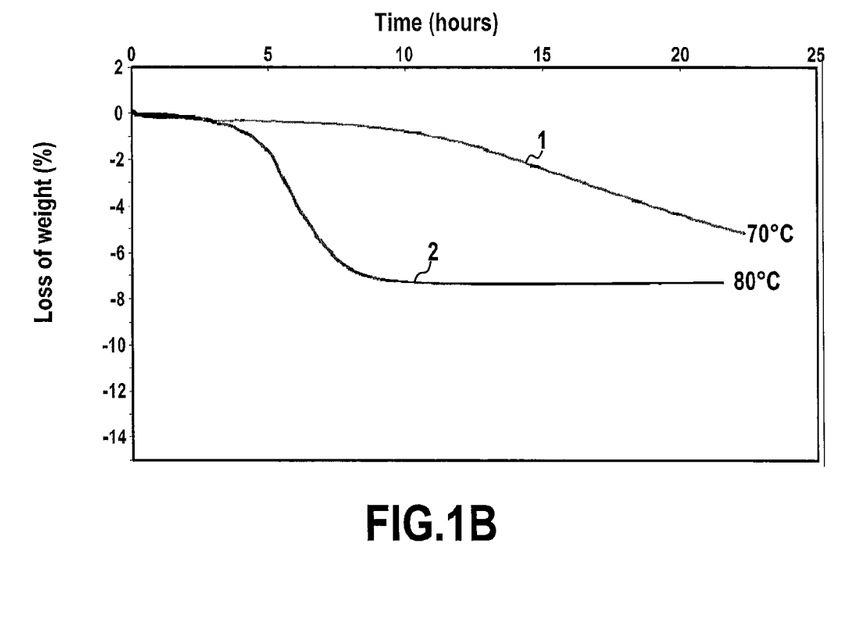

On consideration of the attached FIGS. 1A, 1B and 2, of the figures in table 1 above and of the above comments, it is therefore understood that the problem of the thermal stability of borazane is a real technical problem.

Borazane has a first thermal decomposition stage which starts at low temperatures. It is thus capable of untimely releasing hydrogen (with combined formation of polyaminoborane). Said hydrogen thus untimely released is not, in principle, usable and is, in any case, liable to pose real safety problems.

With regard to this technical problem of the thermal stabilization of borazane, the Applicant now proposes a solution. It proposes novel solid forms containing borazane, in which said borazane is heat-stabilized. These novel solid forms are capable of existing in numerous variants, especially with or without inorganic oxidizing agent in their composition. Characteristically, the borazane present therein is protected by an oxide shell, by a layer of borate. This is explained in detail hereinbelow.

According to its first subject, the present invention thus relates to a process for obtaining a solid form containing heat-stabilized borazane, said solid form being capable of generating hydrogen by thermal decomposition or by a self-maintained combustion reaction. Said process comprises:

making available at least one solid form of borazane chosen from grains of pulverulent powder, granules, pellets, blocks, and mixtures thereof,     heat treating said at least one solid form of borazane, in air, at a temperature of between 50 and 85° C., so as to make an oxidized layer on its surface, said at least one heat-treated solid form of borazane then constituting the desired solid form containing heat-stabilized borazane, which is capable of generating hydrogen by thermal decomposition;

and also optionally comprises:

mixing said at least one solid form of borazane chosen from grains of pulverulent powder and/or granules, heat-treated, with at least one inorganic oxidizing agent, which is in the form (of grains) of a pulverulent powder and/or of granules, optionally followed by     forming said mixture to obtain pellets and/or blocks containing said at least one heat-treated solid form of borazane and said at least one oxidizing agent, said mixture, formed or not formed, containing said at least one heat-treated solid form of borazane and said at least one inorganic oxidizing agent, then constituting the desired solid form containing heat-stabilized borazane, which is capable of generating hydrogen by a self-maintained combustion reaction.

Expressed in a form that makes the various implementation variants of the process of the invention emerge more clearly, said process comprises:

a) making available at least one solid form of borazane chosen from grains of pulverulent powder, granules, pellets, blocks, and mixtures thereof, b) heat treating said at least one solid form of borazane, in air, at a temperature of between 50 and 85° C., the heat treatment generating an oxidized layer at its surface; said at least one heat-treated solid form of borazane then constituting a solid form containing heat-stabilized borazane, which is capable of generating hydrogen by thermal decomposition; and c1) recovering said at least one solid form containing heat-stabilized borazane, which is capable of generating hydrogen by thermal decomposition; or c2) mixing said at least one solid form of borazane, chosen from grains of pulverulent powder and/or granules, heat-treated, with at least one inorganic oxidizing agent, which is in the form (of grains) of a pulverulent powder and/or of granules; the resulting mixture, containing said at least one heat-treated solid form of borazane and said at least one inorganic oxidizing agent, then constituting a solid form containing heat-stabilized borazane, which is capable of generating hydrogen by a self-maintained combustion reaction, and recovering said at least one solid form containing heat-stabilized borazane, which is capable of generating hydrogen by a self-maintained combustion reaction; or c3) mixing said at least one solid form of borazane, chosen from grains of pulverulent powder and/or granules, heat-treated, with at least one inorganic oxidizing agent, which is in the form (of grains) of a pulverulent powder and/or of granules, followed by forming the resulting mixture to obtain pellets and/or blocks containing said at least one heat-treated solid form of borazane and said at least one oxidizing agent; said formed mixture containing said at least one heat-treated solid form of borazane and said at least one inorganic oxidizing agent then constituting a solid form containing heat-stabilized borazane, which is capable of generating hydrogen by a self-maintained combustion reaction, and recovering said at least one solid form containing heat-stabilized borazane, which is capable of generating hydrogen by a self-maintained combustion reaction.

According to a first variant, said solid form containing heat-stabilized borazane (recovered after the heat treatment (in step c1)) is thus capable of generating hydrogen by thermal decomposition. It consists essentially of said stabilized borazane. This type of solid form may be termed a first-generation solid form.

According to a second variant, said solid form containing heat-stabilized borazane (recovered after intervention of the at least one inorganic oxidizing agent, after step c2 or c3) is thus capable of generating hydrogen by a self-maintained combustion reaction. It consists essentially of said stabilized borazane and of at least one inorganic oxidizing agent. This type of solid form may be termed a second-generation solid form. This type of second-generation solid form is obtained from at least one first-generation solid form (and from at least one inorganic oxidizing agent). The second-generation solid forms exist in the form of mixtures of grains of pulverulent powders, of mixtures of granules, of mixtures of grains of pulverulent powder(s) and of granule(s), of pellets and/or blocks.

The analogy with the solid forms containing borazane of the prior art is noted (see the introduction of the present description), in which solid forms said borazane is not heat-stabilized.

According to one or other of the above variants of the invention, the borazane present in the solid forms obtained is present in heat-stabilized form, i.e. is present after having undergone an oxidation heat treatment, i.e. with a (protective) oxidized layer at its surface.

The process of the invention thus comprises a first step of making available the borazane substrate under consideration. This substrate-conventional solid form—is chosen from:

grains of pulverulent powder: such grains generally have a median diameter (by weight) of less than or equal to 500 μm, for example about 350 μm,     granules: such granules generally (logically) have a median diameter (by weight) of greater than 500 μm, for example about 700 μm. They generally have a weight of a few milligrams;

pellets: such pellets generally have a weight from a few tenths of a gram to a few grams. They generally have an equivalent diameter from a few mm (for example 5 mm) to 30 mm, for a thickness, which may or may not be constant, from a few mm (for example 5 mm) to 30 mm. Such pellets may be termed discs when they have a constant low thickness (more particularly combined with a large diameter);

blocks: such monolithic blocks generally have a weight from a few tens of grams to a few hundred grams. They generally have a diameter (equivalent) and a thickness (length) greater than 3 cm. They may especially consist of substantially cylindrical blocks 50 or 80 mm in height and with an equivalent diameter of 80 mm; and     mixtures thereof. In point of fact, it is not excluded in the context of the invention to perform the heat treatment on substrates of different nature (grains of powder, granules, pellets or blocks) or of the same nature, but of different geometry and/or sizes.

Specifically, it is especially possible to treat at the same time blocks and powders, and similarly mixtures of powders of different particle size, blocks of different form and/or dimensions, etc.

It is moreover understood that the base substrate can exist in a great number of forms: spherical, ovoid, cylindrical, etc.

However, it is understood that, in the context of the process of the invention, only one type of substrate is rather treated (=one or more substrates of the same nature) (without this therefore being limiting).

A heat treatment in air (=an oxidation) is thus characteristically applied to said (solid) borazane substrate(s), irrespective of the exact dimensions and forms thereof, so as to constitute at their surface a protective oxidized (borate) layer.

Admittedly, the formation of this oxidized layer does consume some substrate (the following oxidation reaction takes place at the surface: $5NH_3BH_3+6O_2 \rightarrow NH_4B_5O_8$, $4H_2O+3H_2+4NH_3$), and thus hydrogen, but the desired protective effect may be so obtained while minimizing this consumption.

As regards the heat treatment to be performed to make the desired oxidized layer, the following may be indicated, without any limitation whatsoever.

Said heat treatment is advantageously performed at atmospheric pressure. In principle, there is hardly any interest in emburdening the implementation of said process by working at pressures above atmospheric pressure.

Said heat treatment is performed at a temperature (T) between 50 and 85° C. (50° C.≤T≤85° C.). Thus, the desired result is obtained within a reasonable time (i.e. the desired oxidized layer is generated) while at the same time minimizing the consumption of borazane, the formation of polyaminoborane and the loss of hydrogen. Said heat treatment is advantageously performed at a temperature (T) between 70 and 85° C. (70° C.≤T≤85° C.). It is thus sought to obtain a protective oxidized layer of low thickness and to optimize its formation, especially in terms of kinetics. Said heat treatment is generally performed for several hours (for at least 2 hours), very generally between 5 and 25 hours.

Monitoring of the oxidation reaction developed at the surface of the treated solid form of borazane makes it possible to optimize its implementation.

Said heat treatment generates an oxidized layer consisting essentially of ammonium borate of type B5, i.e. tetrahydrated ammonium borate of formula $NH_4B_5O_8 \cdot 4H_2O$. This was confirmed by X-ray diffraction (XRD), by infrared spectroscopy and also by scanning electron microscopy coupled to X-ray spectrometry (SEM/EDX).

Said heat treatment is advantageously performed to generate an oxidized layer whose weight represents less than 10% of the total weight of said at least one heat-treated solid form of borazane, whose weight very advantageously represents from 0.2% to 5% of the total weight of said at least one heat-treated solid form of borazane.

It has been seen that it is in no way advisable to consume too much borazane (to generate an excessively thick oxidized layer).

Said heat treatment by oxidizing the surface of the concerned solid form of borazane heat-stabilizes the constituent borazane of said form. The first-generation solid forms containing borazane of the invention are thus obtained (=solid forms of heat-stabilized borazane).

As indicated above, some of these first-generation solid forms—powders and/or granules—may be used for preparing second-generation solid forms of the invention containing them. These second-generation solid forms consist 1) of mixtures of first-generation powders and/or granules and of powders and/or granules of at least one inorganic oxidizing agent or 2) of such mixtures that have been formed (in the form of pellets and/or blocks). These second-generation solid forms contain, on the one hand, heat-stabilized borazane, and, on the other hand, at least one inorganic oxidizing agent. They are capable of generating hydrogen by a self-maintained combustion reaction. It is noted here that the notions of grains of powder and of granules are the same whether they concern the first-generation solid forms, the inorganic oxidizing agents or the second-generation solid forms, that the notions of pellets and blocks are the same whether they concern the first-generation solid forms or the second-generation solid forms (see the details given below in this respect).

For the implementation of this second variant of the process of the invention (which thus involves the implementation of the first variant and, in addition, the intervention of at least one inorganic oxidizing agent (with or without forming of the mixture obtained)), the at least one inorganic oxidizing agent used is advantageously chosen from perchlorates, dinitroamides, nitrates, metal oxides, and mixtures thereof.

It is very advantageously chosen from ammonium perchlorate, ammonium dinitroamide, strontium nitrate and iron oxide.

Strontium nitrate is particularly preferred.

As regards the forming of the mixture of grains of powder(s) and/or granules (to obtain pellets and blocks), the dry route is warmly recommended.

The ductility of borazane and its creep properties are recalled here. Thus, it is particularly easy to form mixtures (of grains of powder and/or granules) containing borazane by simple compression.

According to its second subject, the present invention relates, as indicated above, to the solid forms containing heat-stabilized borazane, which are capable of generating hydrogen by thermal decomposition or by a self-maintained combustion reaction, which may be obtained via the process described above.

Said solid forms are, as may be readily understood, of first or second generation. Thus, it may be:
  a solid form chosen from grains of pulverulent borazane powder coated with an oxidized layer, borazane granules coated with an oxidized layer, borazane pellets coated with an oxidized layer, borazane blocks coated with an oxidized layer, and mixtures thereof, or
  a solid form chosen from mixtures of grains of pulverulent powders and/or of granules, pellets and/or blocks, containing grains of powder and/or granules of borazane coated with an oxidized layer and grains of powders and/or granules of at least one inorganic oxidizing agent.

The oxidized layer, which surrounds the first-generation solid forms (considered per se or as a constituent element of second-generation solid forms), consists essentially of ammonium borate of the type B5, i.e. tetrahydrated ammonium borate of formula $NH_4B_5O_8 \cdot 4H_2O$ (see above).

As indicated above, said oxidized layer advantageously represents less than 10% by weight, very advantageously from 0.2% to 5% by weight, of the total weight of the first-generation substrates (of said grains of pulverulent powder, granules, discs, pellets and/or blocks, coated with said oxidized layer).

As regards said at least one inorganic oxidizing agent present in the second-generation solid forms, it is recalled that it is advantageously chosen from perchlorates, dinitroamides, nitrates, metal oxides, and mixtures thereof; that it very advantageously consists of ammonium perchlorate, ammonium dinitroamide, strontium nitrate or iron oxide.

The first-generation solid forms of the invention have a structure of shell type surrounding a core, the core consisting of protected borazane and the shell of the protective borate. Said solid forms have acquired a "refractory" nature due to the presence of said shell.

According to its third subject, the present invention relates to a process for generating hydrogen comprising the thermal decomposition or the self-maintained combustion of a solid form containing borazane. Characteristically, the solid form under consideration is a solid form as obtained via the process described above (first subject of the present invention) and/or as stated above (second subject of the present invention). Characteristically, the solid form under consideration contains heat-stabilized borazane (with a protective surface oxidized layer). It is noted here that the protective refractory shell comes off during the thermal decomposition or the self-maintained combustion of the solid form. It does not in any way constitute an obstacle to the "conventional" use of the original solid forms of the invention.

It is now proposed to describe the invention, in a no way limiting manner, with reference to the example below and to the attached FIGS. 3 to 7.

The attached FIGS. 1A, 1B and 2 to 7 show, respectively:

for FIG. 1A: the curve obtained by thermogravimetry, demonstrating the loss of weight of a borazane sample (100 mg of powder, the medium diameter (by weight) of the grains of which is 350 μm) heated to 50° C. under argon;

for FIG. 1B: the curves obtained by thermogravimetry, demonstrating the loss of weight of a borazane sample (100 mg of powder, the medium diameter (by weight) of the grains of which is 350 μm) heated under argon to 70° C. (curve 1) and 80° C. (curve 2), respectively;

for FIG. 2: the curves obtained by differential scanning calorimetry (DSC), with a heating rate of 5° C./min under argon, for borazane samples of the above type (100 mg of powder, the medium diameter of the grains of which is 350 μm). Curve 1 is obtained with the reference borazane powder, curve 2 is obtained with powder of the same type after heat treatment at 70° C. for 24 hours under argon and curve 3 with powder of the same type after heat treatment at 80° C. for 24 hours under argon.

These three figures have been commented on in the introduction of the present text. They demonstrate the heat stability problem of borazane;

for FIG. 3: the curves obtained by thermogravimetry on borazane samples (100 mg of powder, the medium diameter (by weight) of the grains of which is 350 μm) subjected to heat treatments, carried out under a static atmosphere (1 bar) of air for several hours, at temperatures of 80° C., 85° C. and 90° C.;

for FIG. 4: the diffractograms obtained by X-ray diffraction of various samples of the same type (100 mg of powder, the medium diameter (by weight) of the grains of which is 350 μm), not heat-treated (reference product) and heat-treated in air at atmospheric pressure under various temperature conditions. Curve 1 is obtained with the starting (reference) borazane; curve 2 is obtained with borazane heat-treated in air at 80° C. for 20 hours, curve 3 with borazane heat-treated in air at 80° C. for 65 hours, curve 4 with borazane heat-treated in air at 85° C. for 20 hours, curve 5 with borazane heat-treated in air at 90° C. for 20 hours;

for FIG. 5: infrared spectra of a borazane sample (100 mg of powder, the medium diameter (by weight) of the grains of which is 350 μm) not heat-treated (curve 1) and of the sample after treatment in air, at atmospheric pressure, at 80° C. for 20 hours (curve 2);

for FIG. 6: the curves obtained by differential scanning calorimetry (DSC), with a heating rate of 5° C./min under argon, with a starting borazane sample (100 mg of powder, the medium diameter (by weight) of which is 350 μm) (curve 1 corresponding to curve 1 of FIG. 2) and a sample of the same type heat-treated at 80° C., in air, at atmospheric pressure, for 65 hours (curve 1');

for FIG. 7: the curves obtained by thermogravimetry with a starting borazane sample (100 mg of powder, the medium diameter (by weight) of which is 350 μm) heated under argon at 80° C. (curve 1 corresponding to curve 2 of FIG. 1B) and a sample of the same type, heat-treated according to the invention (treatment in air at atmospheric pressure at 80° C. for 20 hours), heated in the same manner, under argon at 80° C. (curve 2).

FIGS. 3 to 7, illustrating the invention, are commented on hereinbelow, with reference to the example.

EXAMPLE

The starting (reference) product used is borazane powder. Its grains have a medium diameter (by weight) of 350 μm.

Samples (100 mg) of said powder were heat-treated according to the invention, under the conditions below: in air, at atmospheric pressure, at temperatures of 80, 85 and 90° C., for several hours.

The heat treatment was performed in a static oven.

The results obtained are shown in the attached FIGS. 3 to 7 and also in Table 2 below.

Figure 3:
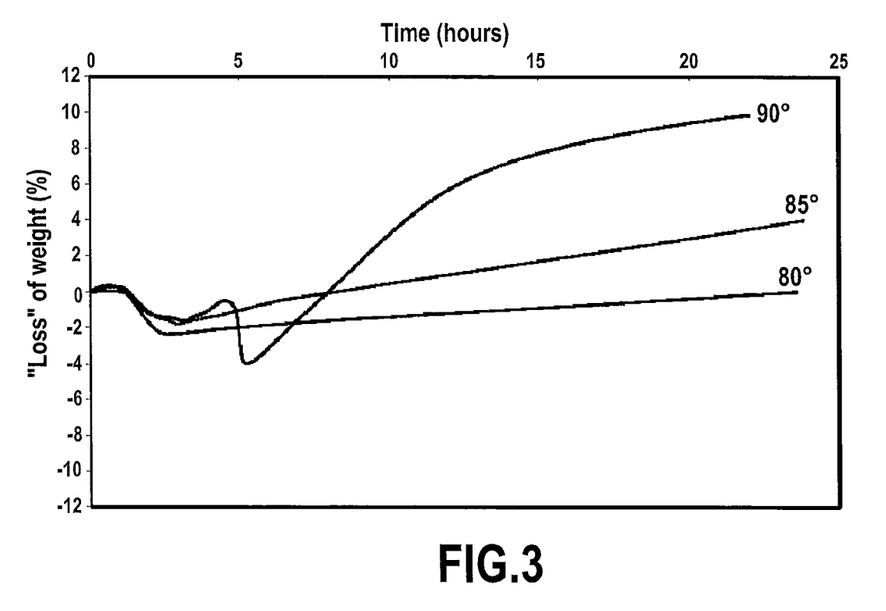

The curves of FIG. 3 show the increase in weight of the borazane treated in air at 80, 85 and 90° C. It is understood that the implementation of the heat treatment at 90° C. is far from being optimized, with regard to the desired protective effect/hydrogen consumption compromise involved in the formation of the protective borate layer. The borate layer generated at 90° C. is far too large, after 10 hours of treatment.

The figures of Table 2 below show this increase in weight of the borazane treated at 80° C. In the final column of said Table 2, the increase in weight has been translated into a theoretical weight of oxidized borazane (% by weight of borazane transformed into ammonium borate of type B5).

TABLE 2

| Time (hours) | Gain in weight in air (%) | Oxidized borazane (%) |
|---|---|---|
| 5 | 0.05 | 0.18 |
| 10 | 0.12 | 0.43 |
| 15 | 0.5 | 1.78 |
| 20 | 0.9 | 3.20 |

Figure 4:
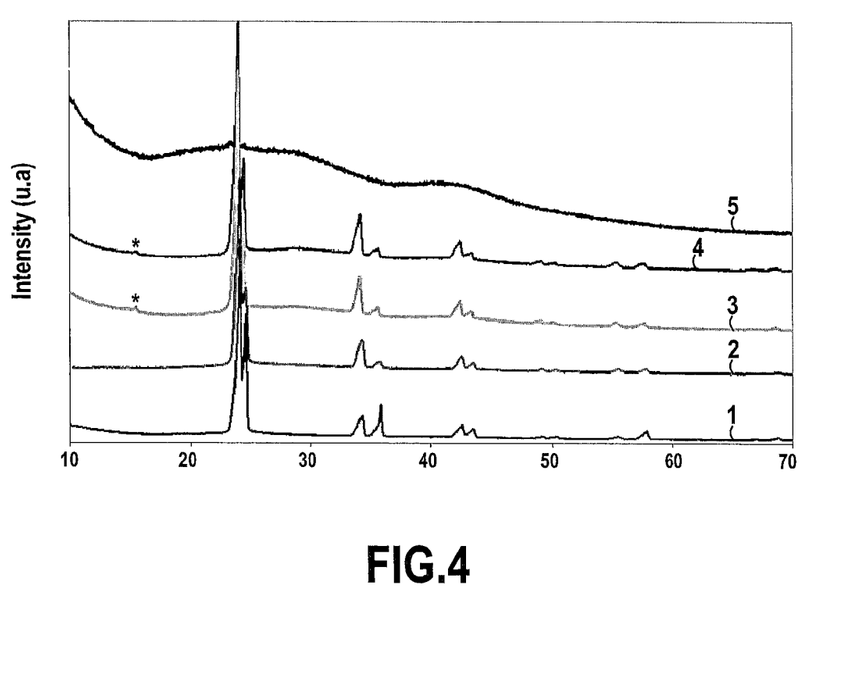

With regard to the diffractograms shown in FIG. 4, the comments below may be made.

Those obtained with the samples heated at 80° C. in air (for 20 hours (curve 2) and for 65 hours (curve 3)) and at 85° C. in air (for 20 hours (curve 4)) remain identical to that of the reference product (untreated borazane) (curve 1). The borazane treated under these conditions has substantially not decomposed. On the other hand, the borazane treated at 90° C. (for 20 hours) has substantially decomposed into polyaminoborane (amorphous). Curve 5 reflects this decomposition. Moreover, the presence of borate of the type B5 is confirmed in said FIG. 4 at the asterisk (curves 3 and 4).

An energy dispersive analysis (EDX) (which made it possible to produce atomic number mapping of the surface of the treated samples) confirmed the presence of a surface layer, with a boron/nitrogen ratio significantly higher than that of the starting borazane. This change in the number of nitrogen atoms at the surface of the heat-treated samples according to the invention confirms the release of $NH_3$ and the surface oxidation according to the reaction: $5NH_3BH_3 + 6O_2 \rightarrow NH_4B_5O_8.4H_2O + 3H_2 + 4NH_3$.

Figure 5:
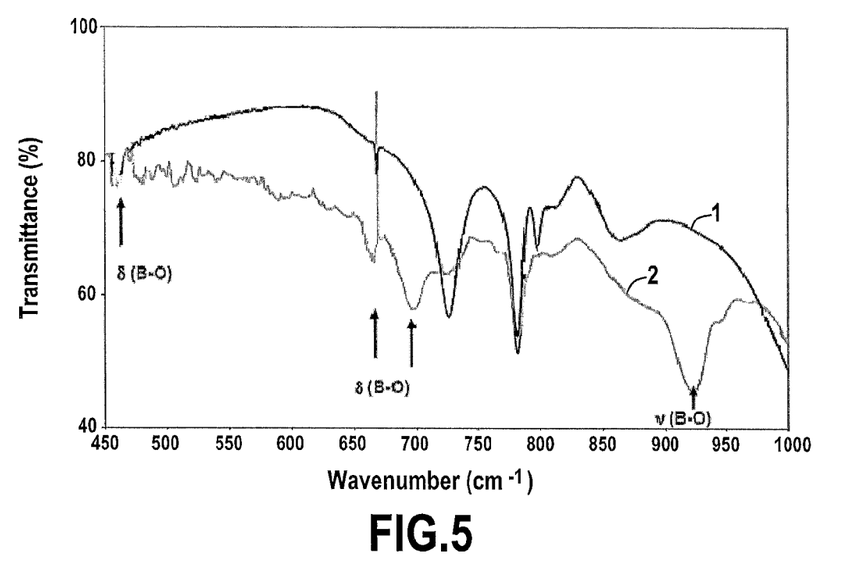

Curve 2 of FIG. 5 confirms the formation of borates.

The vibrations of the borazane bonds are seen in this curve 2 (see curve 1 of this figure) and, in addition, vibrations of the B—O bonds of the borate formed (after heating at 80° C. in air for 20 hours).

Figure 6:
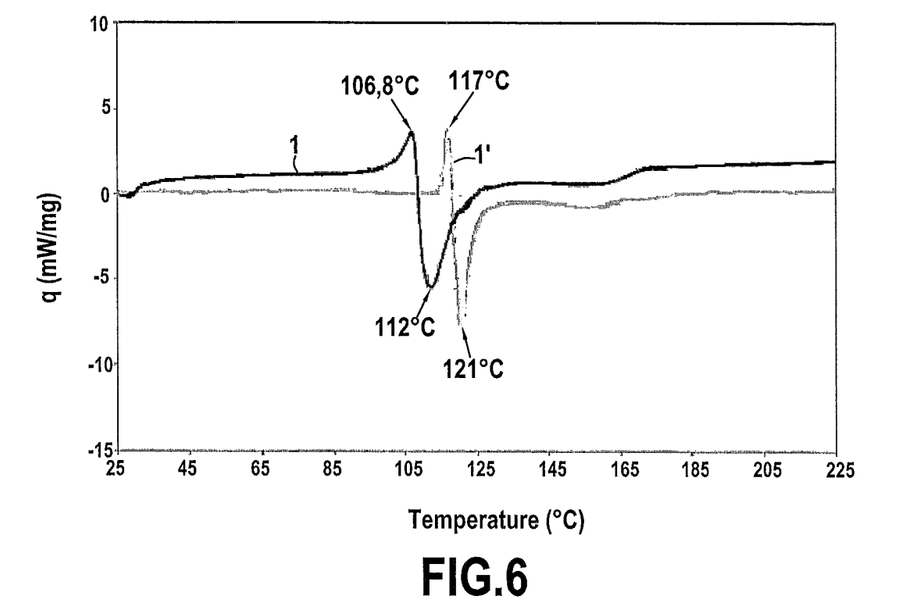

The DSC curves of FIG. 6 confirm the heat stability of the borazane heat-treated according to the invention in air at 80° C. for a time of 65 hours. Specifically, the endothermic melting peak of the borazane is still clearly visible in curve 1'. It may be noted that the melting of the sample treated in air (the grains of which were thus covered with borate) takes place at a higher temperature (which is entirely logical) than that of the reference borazane. The difference is about 10° C. (117° C.-106.8° C.).

Similarly, the first decomposition temperature is shifted (from 112° C. to 121° C.). The treated borazane has become more refractory.

Figure 7:
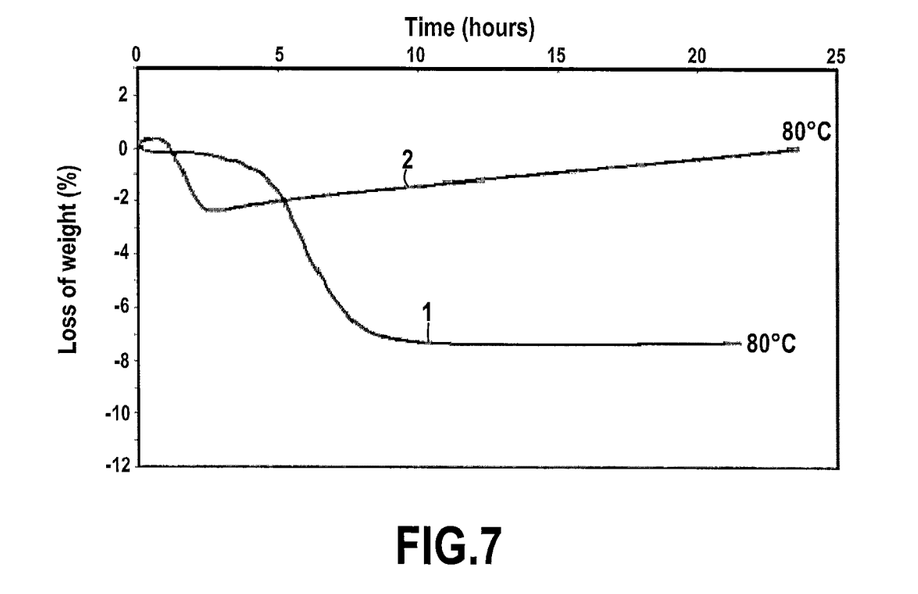

It was confirmed in FIG. 7 that the heat treatment according to the invention makes the borazane more thermally stable.

The samples tested under argon are:

a reference sample (powder as characterized hereinabove): curve 1 shows the thermal instability thereof; and a sample of the same type heat-treated according to the invention (in air at 80° C. for 20 hours): curve 2 shows that said sample is much more stable. The borate layer protects the borazane at the core.

The invention claimed is:

1. A process for obtaining a solid form containing heat-stabilized borazane, said solid form being capable of generating hydrogen by thermal decomposition or by a self-maintained combustion reaction, said process comprising:
a) making available at least one solid form of borazane chosen from grains of pulverulent powder, granules, pellets, blocks, and mixtures thereof,
b) heat treating said at least one solid form of borazane, in air, at a temperature of between 50 and 85° C., the heat treatment generating an oxidized layer at its surface; said at least one heat-treated solid form of borazane then constituting a solid form containing heat-stabilized borazane, which is capable of generating hydrogen by thermal decomposition; and
c1) recovering said at least one solid form containing heat-stabilized borazane, which is capable of generating hydrogen by thermal decomposition; or
c2) mixing said at least one solid form of borazane, chosen from grains of pulverulent powder and/or granules, heat-treated, with at least one inorganic oxidizing agent, which is in the form of a pulverulent powder and/or of granules; a resulting mixture, containing said at least one heat-treated solid form of borazane and said at least one inorganic oxidizing agent, then constituting a solid form containing heat-stabilized borazane, which is capable of generating hydrogen by a self-maintained combustion reaction, and recovering said at least one solid form containing heat-stabilized borazane, which is capable of generating hydrogen by a self-maintained combustion reaction; or
c3) mixing said at least one solid form of borazane, chosen from grains of pulverulent powder and/or granules, heat-treated, with at least one inorganic oxidizing agent, which is in the form of a pulverulent powder and/or of granules, followed by forming the resulting mixture to obtain pellets and/or blocks containing said at least one heat-treated solid form of borazane and said at least one oxidizing agent; said formed mixture containing said at least one heat-treated solid form of borazane and said at least one inorganic oxidizing agent then constituting a solid form containing heat-stabilized borazane, which is capable of generating hydrogen by a self-maintained combustion reaction, and recovering said at least one solid form containing heat-stabilized borazane, which is capable of generating hydrogen by a self-maintained combustion reaction.

2. The process as claimed in claim 1, wherein said heat treatment is performed at atmospheric pressure.

3. The process as claimed in claim 1, wherein said heat treatment is performed at a temperature of between 70 and 85° C.

4. The process as claimed in claim 1, wherein said heat treatment is performed for several hours.

5. The process as claimed in claim 1, wherein said oxidized layer consists essentially of ammonium borate of the type B5, which is tetrahydrated ammonium borate of formula $NH_4B_5O_8.4H_2O$.

6. The process as claimed in claim 1, wherein said oxidized layer has a weight which represents less than 10% of a total weight of said at least one heat-treated solid form of borazane.

7. The process as claimed in claim 1, wherein said oxidized layer has a weight which represents from 0.2% to 5% of a total weight of said at least one heat-treated solid form of borazane.

8. The process as claimed in claim 1, comprising the mixing step, said at least one inorganic oxidizing agent being chosen from perchlorates, dinitroamides, nitrates and metal oxides, and mixtures thereof.

9. The process as claimed in claim 1, comprising the mixing step and the forming step, said forming being performed via a dry route.

10. A solid form containing heat-stabilized borazane, which is capable of generating hydrogen by thermal decomposition or by a self-maintained combustion reaction, which may be obtained via the process as claimed in claim 1.

11. The solid form as claimed in claim 10, chosen from:
grains of pulverulent borazane powder coated with an oxidized layer, borazane granules coated with an oxidized layer, borazane pellets coated with an oxidized layer, borazane blocks coated with an oxidized layer, and mixtures thereof, and
mixtures of grains of pulverulent powders and/or of granules, pellets and/or blocks, containing grains of powder and/or of granules of borazane coated with an oxidized layer and grains of powders and/or granules of at least one inorganic oxidizing agent.

12. The solid form as claimed in claim 11, said oxidized layer consisting essentially of ammonium borate of the type B5, which is tetrahydrated ammonium borate of formula $NH_4B_5O_8.4H_2O$.

13. The solid form as claimed in claim 11, said oxidized layer representing less than 10% by weight of a total weight of said grains of pulverulent powder, granules, disks, pellets and/or blocks, coated with said oxidized layer.

14. The solid form as claimed in claim 11, said at least one inorganic oxidizing agent being chosen from perchlorates, dinitroamides, nitrates, metal oxides, and mixtures thereof.

15. A process for generating hydrogen, comprising a thermal decomposition or the self-maintained combustion of a solid form containing borazane, wherein said solid form containing borazane is a solid form as claimed in claim 10.

16. A process for generating hydrogen, comprising a thermal decomposition or the self-maintained combustion of a solid form containing borazane, wherein said solid form containing borazane is a solid form obtained according to the process of claim 1.

17. The process as claimed in claim 4, wherein said heat treatment is performed between 5 and 25 hours.

18. The process as claimed in claim 8, wherein said at least one inorganic oxidizing agent is chosen from ammonium perchlorate, ammonium dinitroamide, strontium nitrate and iron oxide.

19. The solid form as claimed in claim 13, wherein said oxidized layer represents from 0.2% to 5% by weight of the total weight of said grains of pulverulent powder, granules, disks, pellets and/or blocks, coated with said oxidized layer.

20. The solid form as claimed in claim 14, wherein said at least one inorganic oxidizing agent is chosen from ammonium perchlorate, ammonium dinitroamide, strontium nitrate and iron oxide.

* * * * *